(12) United States Patent
McGovern (10) Patent No.: US 7,581,118 B2
(45) Date of Patent: Aug. 25, 2009

(54) DISK SANITIZATION USING ENCRYPTION

(75) Inventor: William P. McGovern, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 820 days.

(21) Appl. No.: 11/295,214

(22) Filed: Dec. 5, 2005

(65) Prior Publication Data

US 2006/0143476 A1 Jun. 29, 2006

Related U.S. Application Data

(60) Provisional application No. 60/636,360, filed on Dec. 14, 2004.

(51) Int. Cl.
*G06F 12/14* (2006.01)
*G11B 20/12* (2006.01)
(52) U.S. Cl. ........................................ 713/193; 380/59
(58) Field of Classification Search ................ 713/165, 713/191, 193; 380/59
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,235,695 A | 8/1993 | Pence | |
| 5,269,022 A | 12/1993 | Shinjo et al. | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,715 A | 6/1998 | Madany et al. | |
| 5,805,864 A | 9/1998 | Carlson et al. | |
| 5,809,511 A | 9/1998 | Peake | |

(Continued)

FOREIGN PATENT DOCUMENTS

CA 2 256 934 A1 6/2000

(Continued)

OTHER PUBLICATIONS

Chris Lueth, "WORM Storage on Magnetic Disks Using SnapLock Compliance™ and SnapLock Enterprise™", Network Appliance, Inc., Sep. 2003, sections 1-5, 13 pages.

(Continued)

*Primary Examiner*—Nasser G Moazzami
*Assistant Examiner*—Travis Pogmore
(74) *Attorney, Agent, or Firm*—Perkins Coie LLP (57) ABSTRACT

A technique for sanitizing data storage devices, such as magnetic disks, is disclosed. Logical data storage units such as files or portions thereof may be individually deleted and sanitized on a disk. A disk is divided into physical disk regions, each comprising one or more blocks. The contents of the disk are encrypted using a separate encryption key for each physical disk region. If a file or other data structure located in a first disk region and encrypted using a first encryption key is to be deleted, the logical portions (i.e., blocks) of that region that do not belong to the file are re-encrypted using a second encryption key, and the first encryption key is deleted.

21 Claims, 6 Drawing Sheets

U.S. PATENT DOCUMENTS

| | | | |
|---|---|---|---|
| 5,809,543 A | 9/1998 | Byers et al. | |
| 5,854,720 A | 12/1998 | Shrinkle et al. | |
| 5,857,208 A | 1/1999 | Ofek | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,134,660 A | 10/2000 | Boneh et al. | |
| 6,163,856 A | 12/2000 | Dion et al. | |
| 6,173,293 B1 | 1/2001 | Thekkath et al. | |
| 6,173,359 B1 | 1/2001 | Carlson et al. | |
| 6,195,730 B1 | 2/2001 | West | |
| 6,225,709 B1 | 5/2001 | Nakajima et al. | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day, III et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,397,307 B2 | 5/2002 | Ohran | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara et al. | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur et al. | |
| 6,654,912 B1 | 11/2003 | Viswanathan et al. | |
| 6,658,435 B1 | 12/2003 | McCall et al. | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,877,016 B1 | 4/2005 | Hart et al. | |
| 6,898,600 B2 | 5/2005 | Fruchtman et al. | |
| 6,915,397 B2 | 7/2005 | Lubbers et al. | |
| 6,931,557 B2 | 8/2005 | Togawa et al. | |
| 6,950,263 B2 | 9/2005 | Suzuki et al. | |
| 6,973,534 B2 | 12/2005 | Dawson et al. | |
| 6,978,283 B1 | 12/2005 | Edwards et al. | |
| 6,978,325 B2 | 12/2005 | Gibble et al. | |
| 7,007,043 B2 | 2/2006 | Farmer et al. | |
| 7,020,779 B1 | 3/2006 | Sutherland | |
| 7,032,126 B2 | 4/2006 | Zalewski et al. | |
| 7,055,009 B2 | 5/2006 | Factor et al. | |
| 7,096,331 B1 | 8/2006 | Haase et al. | |
| 7,100,089 B1 | 8/2006 | Phelps | |
| 7,111,136 B2 | 9/2006 | Yamagami | |
| 7,111,194 B1 | 9/2006 | Schoenthal et al. | |
| 7,127,388 B2 | 10/2006 | Yates et al. | |
| 7,152,078 B2 | 12/2006 | Yamagami | |
| 7,155,465 B2 | 12/2006 | Lee et al. | |
| 7,155,586 B1 | 12/2006 | Wagner et al. | |
| 7,200,726 B1 | 4/2007 | Gole et al. | |
| 7,203,726 B2 | 4/2007 | Hasegawa | |
| 7,346,623 B2 | 3/2008 | Prahlad et al. | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0091670 A1 | 7/2002 | Hitz et al. | |
| 2002/0095557 A1 | 7/2002 | Constable et al. | |
| 2002/0144057 A1 | 10/2002 | Li et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0005313 A1 | 1/2003 | Gammel et al. | |
| 2003/0025800 A1 | 2/2003 | Hunter et al. | |
| 2003/0037211 A1 | 2/2003 | Winokur | |
| 2003/0046260 A1 | 3/2003 | Satyanarayanan et al. | |
| 2003/0120676 A1 | 6/2003 | Holavanahalli et al. | |
| 2003/0126136 A1 | 7/2003 | Omoigui | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0158766 A1 | 8/2003 | Mital et al. | |
| 2003/0182350 A1 | 9/2003 | Dewey | |
| 2003/0188208 A1 | 10/2003 | Fung | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0103147 A1 | 5/2004 | Flesher et al. | |
| 2004/0167903 A1 | 8/2004 | Margolus et al. | |
| 2004/0168034 A1 | 8/2004 | Homma et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0097260 A1 | 5/2005 | McGovern et al. | |
| 2005/0108302 A1 | 5/2005 | Rand et al. | |
| 2005/0144407 A1 | 6/2005 | Colgrove et al. | |
| 2005/0182910 A1 | 8/2005 | Stager et al. | |
| 2005/0240813 A1 | 10/2005 | Okada et al. | |
| 2006/0010177 A1 | 1/2006 | Kodama | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |

| | | | |
|---|---|---|---|
| 2006/0047925 | A1 | 3/2006 | Perry |
| 2006/0047989 | A1 | 3/2006 | Delgado et al. |
| 2006/0047998 | A1 | 3/2006 | Darcy |
| 2006/0047999 | A1 | 3/2006 | Passerini et al. |
| 2006/0143376 | A1 | 6/2006 | Matze et al. |
| 2006/0259160 | A1 | 11/2006 | Hood et al. |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |
| EP | 1333379 A2 | 8/2003 |
| EP | 1671231 | 6/2006 |
| WO | WO-9906912 | 2/1999 |
| WO | WO-9903098 | 11/1999 |
| WO | WO 01/18633 A1 | 3/2001 |
| WO | WO-0118633 A1 | 3/2001 |
| WO | WO 03/067438 A2 | 8/2003 |
| WO | WO-03067438 A2 | 8/2003 |
| WO | WO 2004/084010 A2 | 9/2004 |
| WO | WO-2004084010 A2 | 9/2004 |
| WO | WO-2005031576 A2 | 4/2005 |
| WO | WO-2006023990 A2 | 3/2006 |
| WO | WO-2006023991 A2 | 3/2006 |
| WO | WO-2006023992 A2 | 3/2006 |
| WO | WO-2006023993 A2 | 3/2006 |
| WO | WO-2006023994 A1 | 3/2006 |
| WO | WO-2006023995 A2 | 3/2006 |

OTHER PUBLICATIONS

"Network Appliance WORM Storage Solution: SEC 17 a-4(f) Compliance Assessment", Network Appliance, Inc., Jul. 10, 2003, pp. i-20.
Simson L. Garfinkel et al., "Remembrance of Data Passed: A Study of Disk Sanitization Practices", IEEE Security and Privacy, vol. 1, No. 1, 2003, 19 pages.
Decru, "Decru Datafort E-Series Storage Security Appliances, Transparent Data Security for Network Attached Storage (NAS)", 2004. 2 pages.
Joan Daemen et al., "Note on Naming", Rijndael, Sep. 4, 2003, 2 pages.
Joan Daemen et al., "AES Proposal: Rijndael", The Rijndael Block Cipher, Document Version 2, Mar. 9, 1999, 45 pages.
"Alacritus Announces Disk-Based Successor to Tape", Knapp Comm., Aug. 21, 2002.
"Alacritus Creates 'Next Critical Step' in Disaster Recovery for Patrick Air Force Base, Securitus VTL Sets the Pace", Apr. 20, 2004.
"Alacritus to Demo Chronospan Continuous Data Protection with the Cisco MDS 9000", Apr. 1, 2004.
"Alacritus, Hitachi CP and Nissho Team to Create Virtual Tape Library Appliance: Industry's First Virtual Tape Library Appliance to Replace Storage Tape Libraries", Alacritus Software, Inc., Jun. 25, 2001.
"Alacritus, Hitachi CP and Nissho Team to Create Virtual Tape Library" internetnews.com, Jun. 25, 2001.
"Alacritus and Network Appliance Deliver Advanced Virtual Tape Library, Solution Shortens Backup Windows, Accelerates Data Recovery, and Simplifies Backup Management", Dec. 7, 2004.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability", Alacritus Software, Jul. 8, 2002.
"Alacritus Software Announces Securitus I, the Industry's First Virtual Tape Library Solution: Securitus I Hearlds Advent of 'Disruptive Technology' that Serves as Replacement to Tape Libraries", Alacritus Software, Inc. Jun. 25, 2001.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Apr. 9, 2002.
"Alacritus Software Announces Virtual Tape Library Support for Legato Networker Data Protection Solution", Alacritus Software, Inc., Jan. 8, 2002.
"Alacritus Software's Chronospan: Make Time for Continuous Data Protection", Aberdeen Group, Inc., Oct. 2003.
"Alacritus Software FAQs" Alacritus Software, Inc. Jul. 2001.
"Alacritus Software's Securitus: Defining the Way to Virtual Tape Libraries", Aberdeen Group, Inc. Jul. 2003.
"Alacritus Software's Securitus I: Pointing the Way to Virtual Tape Libraries" Aberdeen Group, Inc. Mar. 2002.
Baltazar, Henry "More Intelligence is on the Way" eWEEK, Sep. 15, 2003.
Baltazar, Henry "Weaving Apps into SAN Fabric" eWEEK, Mar. 24, 2003.
Barrett, Alex, "The Case for Network Smarts", Storage Magazine, Jun. 2003.
Biggar, Heidi, "Alacritus Enables Disk-Based Backup", InfoStor, Sep. 2001.
Biggar, Heidi, "Disk and Tape Forge New Partnerships in backup Arena" InfoStor, Nov. 2001.
Camphusein, Alicia, "Hitachi Inks OEM Deal with Legato", Knapp Comm., Jul. 2002.
"Case Study Shizuoka-ken Noukyou Densan Center K.K., Reducing Management Costs Through Tapeless Backup At An iDC", Apr. 7, 2004.
"Chronospan" Alacritus Website, Oct. 2003.
"Cisco and Storage ISVs to Demo Protocol-Based Interface between Storage Appliances and the Cisco MDS 9000", Mar. 30, 2004.
"Continuous Data Protection: Business Continuity for the Era of Networked Storage: An Executive White Paper", Aberdeen Group, Inc., Jul. 2003.
"Customer Success" Alacritus Website, Oct. 2003.
Joan Daemen et al., "Note on Naming", Rijndael, Sep. 4, 2003, 2 pages.
"Disk-Based Data Protection" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Simon L. Garfinkel et al., "Rememberance of Data Passed: A Study of Disk Sanitization Practices", IEEE Security and Privacy, vol. 1, No. 1, 2003 19 pages.
Hill, David "Alacritus Software's Securitus: Defining the Way to Virtual Taped Libraries" Aberdeen Group, Inc. Jul. 2003.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library", Alacritus Software, Inc., Oct. 3, 2001.
Hatfield. "Write Read Verify Feature Set". May 14, 2004.
Komeiga, Kevin, "Vendor Pushes Disk Backup Over Tape" SearchStorage.com, Jan. 10, 2003.
Chris Lueth, "WORM Storage on Magnetic Disks Using SnapLock Compliance™ and SnapLock Enterprise™", Network Applicance, Inc., Sep. 2003, sections 1-5 13 pages.
"Manageability: Securitus v. Tape", Alacritus Website, Oct. 2003.
Microsoft Windows XP, released 2001.
"No Changes Required: Securitus v. Tape" Alacritus Website, Oct. 2003.
Novell NetWare Server Disks And Storage Devices Administration Guide. Netware 5.1, Jan. 2000, pp. 1-60.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ "Alacritus Software Announces New Customers for Securitus VTLA", Alacritus Software, Inc. Jan. 13, 2004.
Preston, W. Curtis, "Surprise! Cheap Disks Cure Slow Backup", Storage Magazine, Jun. 1, 2002.
"Product Brief: Rhapsody/Alacritus-Securitus/Xpath Virtual Tape in the Fabric", The Enterprise Storage Group, Aug. 2002.

"Scalability : Securitus v. Tape", Alacritus Website, Oct. 2003.
"Seamless Integration", Alacritus Website, Oct. 2003.
"Securitus", Alactritus Website, Oct. 2003.
"Securitus I White Paper: Disk Based Data Protection from Alacritus Software" Alacritus Software, Inc. Jul. 2001.
"Securitus White Paper: Disk Based Data Protection from Alacritus Software", Alacritus Website, Oct. 2003.
"Strengths: Securitus v. Tape", Alacritus Website, Oct. 2003.
"Testimonials", Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"Topologies", Alacritus Website, Oct. 7, 2003.
Trimmer, Don "Tape Free Backup/Recovery: Requirements and Advantages: Virtualization Technology Will Encompass Many Applications, One of the Most Significant Possibly Being Backup/Recovery", InfoStor, Mar. 2002.
"Virtual Tape Library Technology Brochure", Alacritus Software Inc., Jul. 2001.
U.S. Appl. No. 10/933,005, entitled, "Method And Apparatus For Maintaining Compliant Storage," filed on Sep. 1, 2004, of Stephen Manley et al.
U.S. Appl. No. 10/932,683, entitled, "Method And Apparatus For Mirroring Non-Compliante Storage To Compliant Storage," filed Sep. 1, 2004 of William McGovern et al.
U.S. Appl. No. 11/227,812, entitled, "Read-After-Write Verification For Improved Write-Once-Read-May Data Storage," filed On Sep. 14, 2005, of William McGovern.
U.S. Appl. No. 11/227,813, entitled, "Disk Sanitization In An Active File System," filed Sep. 14, 2005, of William McGovern.
U.S. Appl. No. 11/339,979, entitlted, "Method And Apparatus To Automatically Commit Files To Worm Status," filed on Jan. 25, 2006, of Jeffrey Merrick et al.

U.S. Appl. No. 11/227,329, entitled, "Method And Apparatus For Verifiably Migrating WORM Data," filed on Sep. 14, 2005, of William McGovern et al.
U.S. Appl. No. 11/227,812 filed Sep. 14 2005 Read-After-Write Verification for Improved Write-Once-Read-Many Data Storage Office Action dated Nov. 7, 2008.
U.S. Appl. No. 11/339,979 filed Jan. 25, 2006 Method and Apparatus to Automatically Commit Files to Worm Status Office Action dated May 1, 2008 and Oct. 20, 2008.
U.S. Appl. No. 11/227,813 filed Sep. 14, 2005 Disk Sanitization in an Active File System Office Action dated Jun. 6, 2008.
U.S. Appl. No. 11/051,792 filed Feb. 4, 2005 Method and System for Browsing Objects on a Protected Volume In a Continuous Data Protection System Office Action dated May 21, 2008.
U.S. Appl. No. 11/051,793 filed Feb. 4, 2005 Method and System for Backing Up Data Office Action dated Aug. 15, 2008.
U.S. Appl. No. 11/413,327 filed Apr. 28, 2006 Method and System for Remote Data Recovery Office Action dated Sep. 3, 2008.
U.S. Appl. No. 11/051,794 filed Feb. 4, 2005 Method and Apparatus for Managing Backup Data Office Action dated May 7, 2008.
U.S. Appl. No. 11/051,952 filed Feb. 4, 2005 Method and Apparatus for Deleting Data Upon Expiration Office Action dated Jun. 13, 2008 and Nov. 28, 2008.
U.S. Appl. No. 11/227,329 filed: Sep. 14, 2005 Inventor: McGovern, et al. 'Method and Apparatus for Verifiably Migrating Worm Data.
U.S. Appl. No. 10/933,005 filed: Sep. 1, 2004 Inventor: Manley, et al. Method and Apparatus for Maintaining Compliant Storage.
U.S. Appl. No. 11/051,862 filed: Feb. 4, 2005 Inventor: Stager, et al. Method and System for Adding Redundancy to a Continuous Data Protection System.
U.S. Appl. No. 11/833,515 filed: Aug. 3, 2007 Inventor: Stager, et al. Method and System for Storing Data Using a Continuous Data Protection System.
U.S. Appl. No. 12/040,276 filed: Feb. 29, 2008 Inventor: Stager, et al. Method and System for Restoring a Volume In a Continuous Data Protection System.

DISK SANITIZATION USING ENCRYPTION

This application claims the benefit of U.S. provisional patent application No. 60/636,360, filed on Dec. 14, 2004 and entitled, "Disk Sanitation Using Encryption," which is incorporated herein by reference.

FIELD OF THE INVENTION

The invention generally relates to data storage and, more specifically, the invention relates to sanitization of disks using encryption.

BACKGROUND

When data is deleted from a magnetic disk such as a hard drive, the data can often be recovered. A hard drive typically comprises many addressable "blocks," or individual units of data. A file or other logical data storage unit typically comprises data written to the blocks and an entry in a file structure that includes pointers that point to the blocks storing the data. The delete function of many file systems only removes the pointers; the data itself remains intact. Even after a low-level format of a hard drive, data stored on the drive may be recoverable. In many applications, however, it may be undesirable for certain data (e.g., sensitive or confidential data) to remain recoverable after deletion. In such applications, it may be desirable to "sanitize" a mass storage device, such as a magnetic disk.

Generally, sanitization involves making the data blocks on the disk unreadable so that sensitive data is unrecoverable. Several techniques for "sanitizing" a magnetic disk are known today. One way to sanitize a hard drive is to physically destroy the drive. For example, the drive may be dismantled or otherwise physically altered. Another physical method is to degauss the disk by applying a powerful alternating magnetic field to the disk. The degaussing technique changes the orientation of the magnetic particles on the disk platter.

If the drive is to be reused, it can be sanitized by writing over the data already on the disk. This approach is known as "media overwrite" sanitization. Media overwrite sanitization may be as simple as writing logic zeros to every bit on a drive, or writing different predetermined or random patterns to the drive. Writing over the drive once is known as a "single pass" overwrite. Writing over the drive multiple times is known as "multiple pass" overwrite. Different users require different levels of sanitization. For example, a user storing sensitive information, such as confidential trade secrets, may want to perform a greater number of passes.

Several different "patterns" have been developed to perform media overwrite sanitization. A pattern is the sequence of bits (ones and zeros) that is written to the drive in order to prevent recovery of deleted data. The "Guttman" pattern is an example of a pattern used by many hard drive sanitization applications. Using a multiple pass overwrite, different patterns may be used for each pass. For example, the first pass may use a particular pattern, where the second pass may use the pattern's complement, and the third pass may use random data.

Figure 1:
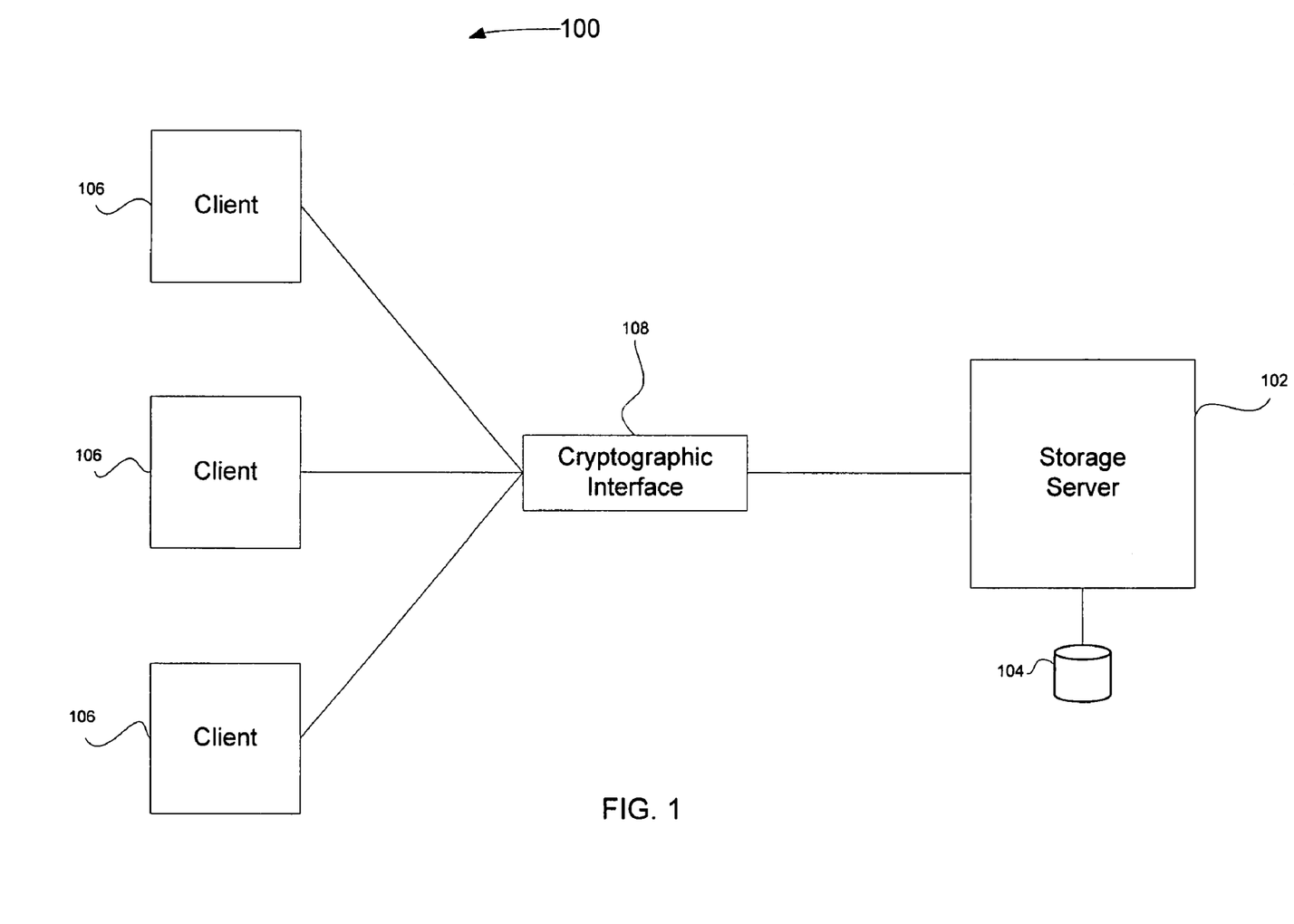
FIG. 1 illustrates a system for sanitizing a magnetic data storage device such as a hard drive.

FIG. 1 illustrates an example of a system 100 that can be used for storing data. The system 100 includes a storage server 102 that manages a volume 104 which comprises one or more physical magnetic drives. The data stored in the volume 104 is encrypted. The encrypted data can only be accessed using an appropriate encryption key, which can be a random series of bits (typically between 40 and 512 bits) used to encode the data stored on the volume 104. The clients 106 may access the volume 104, to read to write data, through a cryptographic interface 108 and the storage server 102. The read and write requests and associated data are encrypted and decrypted by the cryptographic interface 108.

The volume 104 can be sanitized by discarding the encryption key, since the data on the volume 104 is unreadable without they key, and typical encryption standards (such as the advanced encryption standard (AES) encryption standards including AES-256 and AES-512) are computationally infeasible to compromise with currently existing technology. Removing the cryptographic interface 108 would provide further protection against undesired recovery of the deleted (encrypted) data.

A shortcoming of known sanitization techniques and system 100 is that they sanitize only at a disk-wide level of granularity. When a hard drive or other storage device is being retired or removed from use, the entire device (e.g., the entire disk drive) is sanitized to protect the data. However, in some instances, it may be desirable to sanitize only a portion of the disk drive. For example, storage users that are subject to government regulations regarding the retention of data may want to delete and sanitize only the particular files that the users are permitted to delete. The regulations may require that the user retain the other files. In some instances, it may be desirable to be able to sanitize only a portion of a file, e.g., only certain blocks. Further, in the system 100 of FIG. 1, the cryptographic interface 108 undesirably introduces additional hardware between the storage server 102 and the clients 106.

SUMMARY

The present invention includes a method and apparatus for disk sanitization using encryption. The method includes encrypting data stored on a disk, including a set of blocks, by using a first encryption key. The method further includes, in response to a request to delete the set of blocks, re-encrypting blocks stored on the disk other than the set of blocks, by using a second encryption key, and not re-encrypting the set of blocks, and deleting the first encryption key.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for disk sanitization using encryption. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to embodiments of the invention, logical data storage units such as files or portions thereof (e.g., individual blocks) may be individually deleted and sanitized. The disk on which the files are located is divided into physical disk regions, where each region can include one or more blocks of data. The contents of the disk are encrypted using a separate encryption key for each physical disk region (which can mean a separate encryption key for each block, if a region is defined as a single block). If a file or other data structure located in a first disk region and encrypted using a first encryption key is to be deleted, the logical portions (i.e., blocks) of that region that do not belong to the file are re-encrypted using a second encryption key, and the first encryption key is then deleted. The first encryption key may be deleted using overwrite sanitization or other techniques. It is to be understood that the files or data structures being deleted may span more than one disk region.

Figure 2:
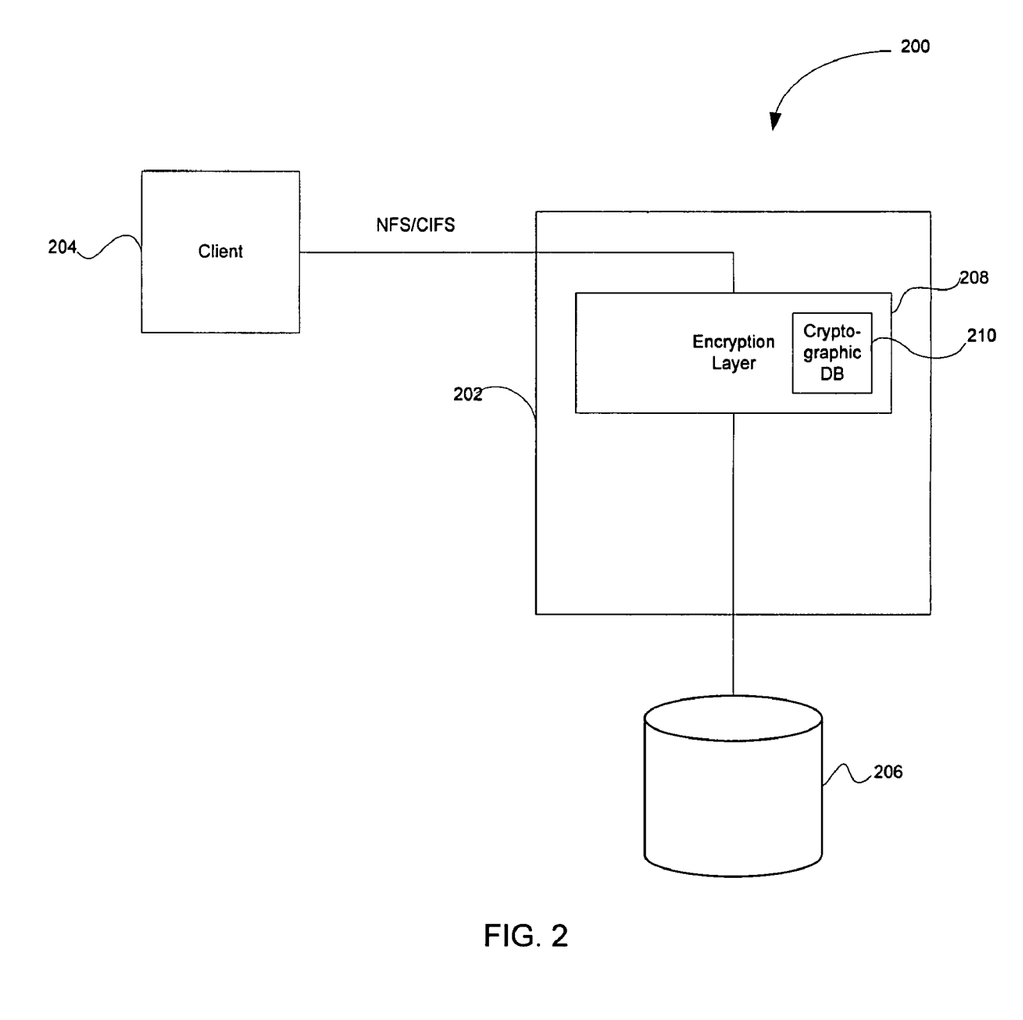
FIG. 2 illustrates a storage server that may be used to implement embodiments of the present invention.

FIG. 2 illustrates a storage server that may be used to implement embodiments of the present invention. A system 200 shows a storage server 202 having a client 204 connected thereto. Using a network attached storage (NAS) configuration, the client 204 may communicate with the storage server 202 using various communication protocols such as the Network File System (NFS) or Common Internet File System (CIFS) protocols.

The client 204 accesses and uses a volume 206 for data service. The volume 206 may comprise one or more drives, including one or more magnetic disks such as hard drives. The client 204 communicates with the volume 206 through an encryption layer 208. The encryption layer 208 encrypts and decrypts incoming and outgoing data. The volume 206 may be encrypted using several encryption keys. According to one embodiment of the invention, each physical disk region in the volume 206 has a unique encryption key. The encryption layer 208 includes hardware and software components to aid in encryption and to store the encryption keys. The encryption layer 208 includes a cryptographic key database 210 that includes each unique encryption key for each disk region in the volume 206.

The storage server 202 may be any one of several different types of storage servers, including those that employ a NAS or Storage Area Network (SAN) approach. For example, the storage server 202 may be a filer server, or filer, that stores data in the form of files.

Figure 3:
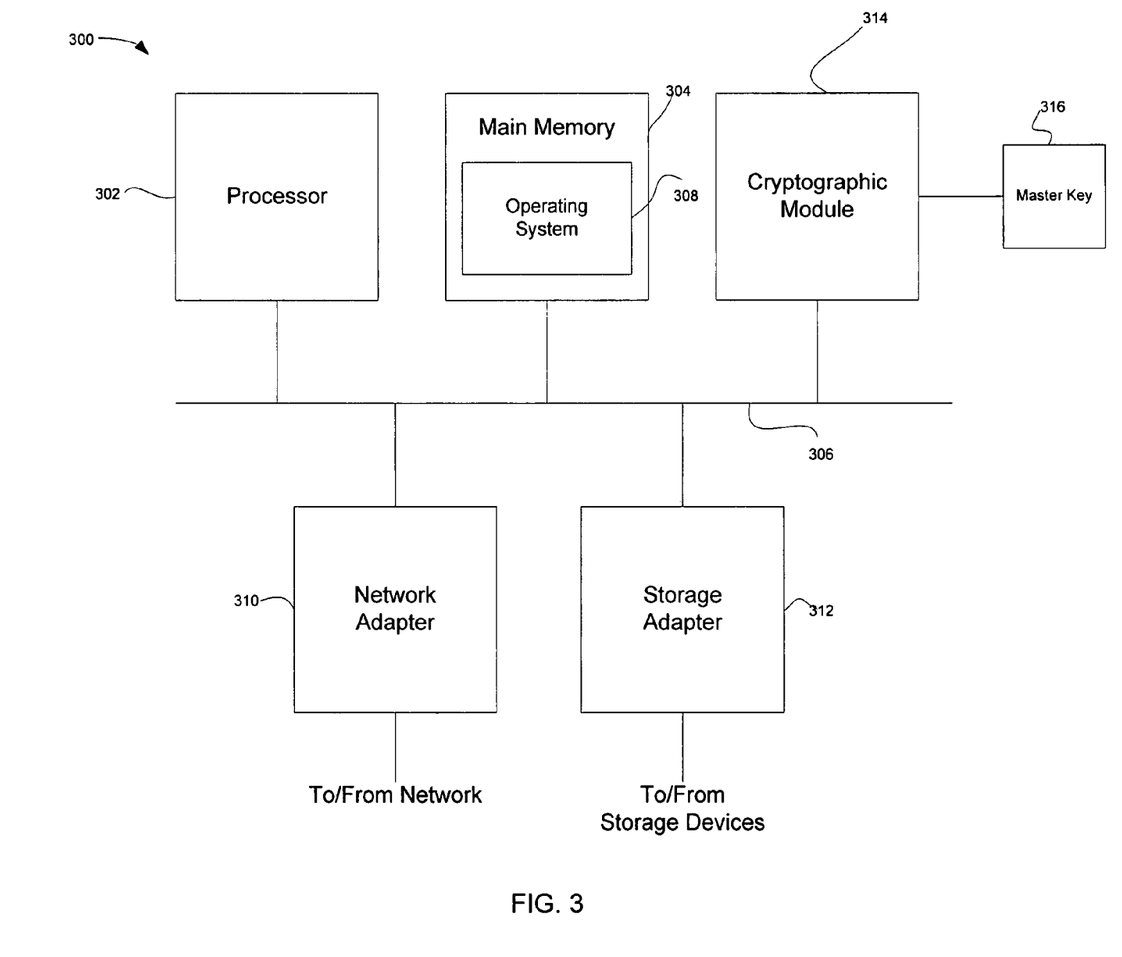
FIG. 3 shows the architecture of a storage server according to certain embodiments of the invention.

FIG. 3 shows the architecture of a filer 300 such as the storage server 202 according to certain embodiments of the invention. Note that certain standard and well-known components which are not germane to the present invention are not shown. The filer 300 includes a processor 302 and main memory 304, coupled together by a bus system 306. The bus system 306 in FIG. 3 is an abstraction that represents any one or more separate physical buses and/or point-to-point connections, connected by appropriate bridges, adapters and/or controllers. The bus system 306, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 302 is the central processing unit (CPU) of the filer 300 and, thus, controls the overall operation of the filer 300. In certain embodiments, the processor 302 accomplishes this by executing software stored in main memory 304. The processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 304, which is generally some form of random access memory (RAM), stores the operating system 308 of the filer 300. Techniques of the present invention may be implemented within the operating system 308, as described further below. The operating system 308 may be, for example, the ONTAP operating system by Network Appliance, Inc., of Sunnyvale, Calif. (NetApp®). Also connected to the processor 302 through the bus system 306 are a network adapter 310 and a storage adapter 312. The network adapter 310 provides the filer 300 with the ability to communicate with remote devices, such as clients and/or another filer, over a network and may be, for example, an Ethernet adapter. The storage adapter 312 allows the filer to access the external mass storage devices and may be, for example, a Fibre Channel (FC) adapter or SCSI adapter.

A cryptographic module 314 is coupled to the bus 306. The cryptographic module 314 may be considered a part of the encryption layer 208 of FIG. 2. The cryptographic module 314 may be implemented in software or as a hardware accelerator, such as an integrated circuit (IC) mounted on a system motherboard, a daughterboard or adapter card. The cryptographic module 314 performs the encryption and decryption functions of the system 300. The cryptographic module 314 accesses the cryptographic key database 210 (see FIG. 2) that includes the several encryption keys for every disk region of the storage devices.

The master key 316 is an integrated circuit (IC) mounted on the motherboard or a daughterboard or expansion card of the system 300. The IC storing the master key 316 may implement physical security and tamper resistant measures, such as being encased in epoxy, to prevent compromise of the stored encryption key. The master key 316 contains a master encryption key that is used to encrypt the cryptographic key database 210. Since the master key 316 is a hardware component, the cryptographic key database 210 cannot be accessed by any system other than the system 200. Further, since the master key 316 cannot be removed and used in another system, the data encrypted using the master key 316 will remain secure.

Figure 4:
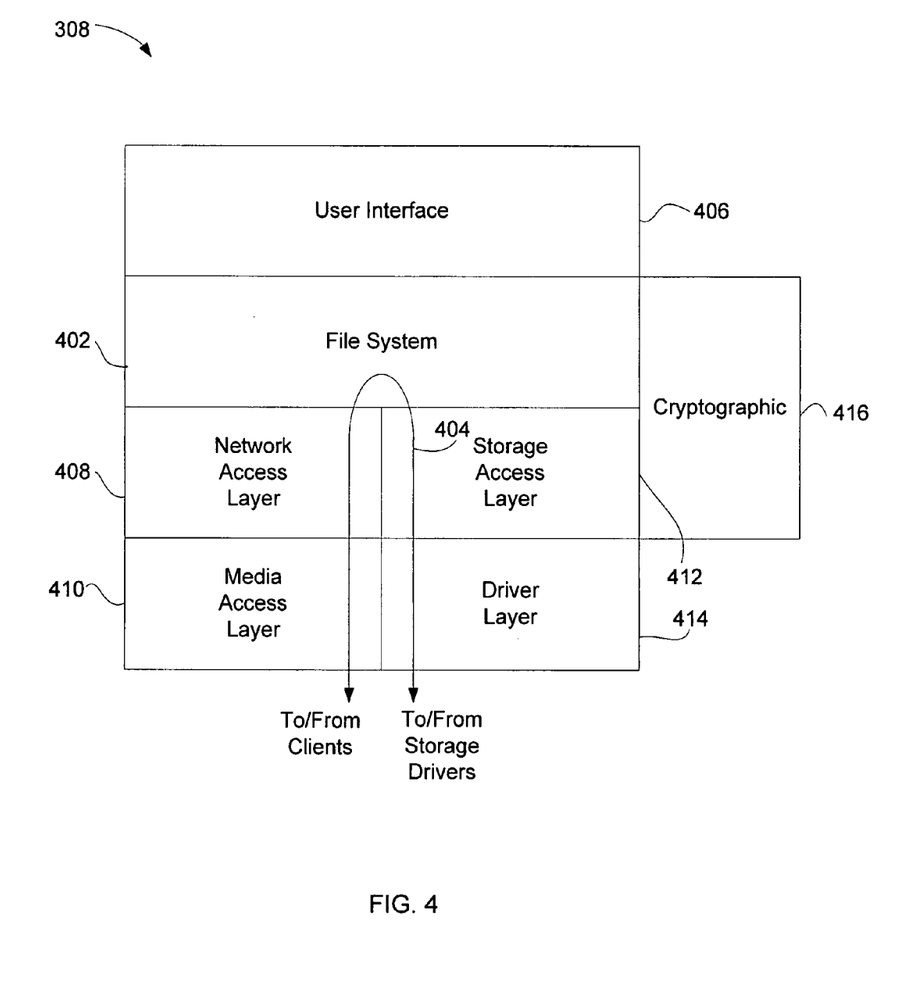
FIG. 4 illustrates the operating system of the storage server of FIG. 3, according to certain embodiments of the invention.

FIG. 4 illustrates the operating system 308 of the filer 300 of FIG. 3, according to certain embodiments of the invention. As can be seen, the operating system 308 includes a number of layers. The core of the operating system 308 is the file system 402. The file system 402 is a programmatic entity that imposes structure on an address space of one or more physical or virtual storage devices, such as disks, so that the operating system 308 may conveniently read and write data containers, such as files and blocks, and related metadata. The file system 402, among other responsibilities, executes read and write operations on the mass storage devices in response to client requests, maintains directories, and manages consistency point operations. An example of a file system suitable for this purpose is the Write Anywhere File Layout to (WAFL) file system from Network Appliance, such as used in the NetApp® Filers. The file system 402 in certain embodiments operates on blocks of data of a predetermined exemplary size, such as 4 Kbytes. Also shown in FIG. 4 is the logical data path 404 from clients to mass storage devices, through the file system 402.

The operating system 308 also includes a user interface 406, through which a network administrator or other user can control and/or configure the filer (e.g., remotely from a management station). The user interface 406 may generate a command line interface and/or a graphical user interface for this purpose. On the client side the operating system 308 includes a network access layer 408 and, at the lowest level, a media access layer 410. The network access layer 408 implements any of various protocols used to communicate with client devices, such as network file system (NFS), common Internet file system (CIFS) and/or hypertext transport protocol (HTTP). The media access layer 410 includes one or more drivers which implemented the protocols used to communicate over the network, such as Ethernet.

On the storage device side, the operating system 308 includes a storage access layer 412 and, at the lowest level, a driver layer 414. The storage access layer 412 implements a disk storage protocol such as RAID, while the driver layer 414 implements a lower-level storage device access protocol, such as Fibre Channel or SCSI.

The file system 208 also includes a cryptographic module 416. The cryptographic module 416 interfaces with the cryptographic module 314 of FIG. 3 through the file system 402 and the storage access layer 412. The cryptographic module 416 sends instructions and data to and receives data form the cryptographic module 314. The cryptographic module 416 further provides an interface between the cryptographic key database 210 of FIG. 2 and the cryptographic module 314.

Figure 5:
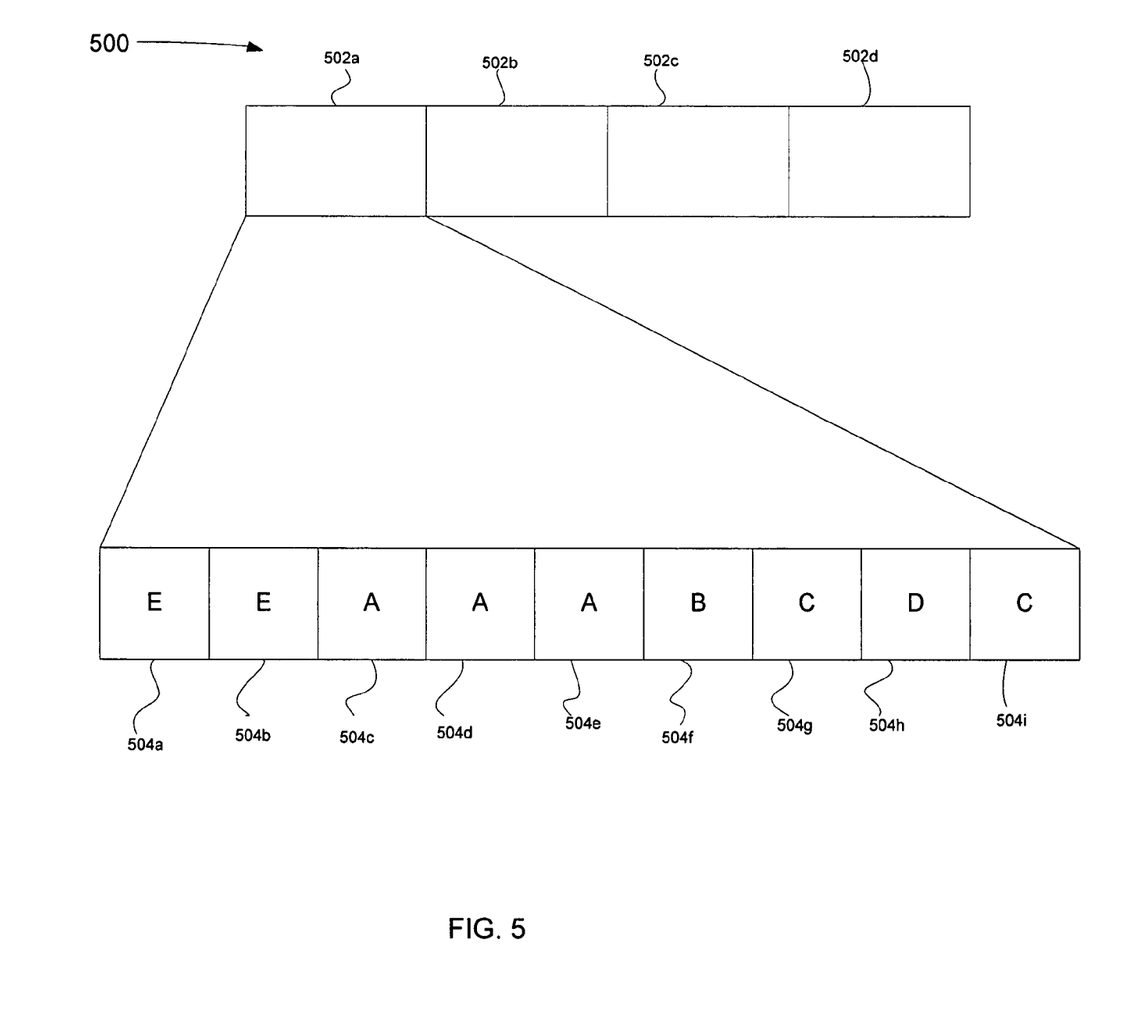
FIG. 5 illustrates physical disk regions including stored data.

FIG. 5 illustrates an example of how data may be stored on a disk divided into multiple physical disk regions. A disk 500 is divided into several physical disk regions 502. The disk 500 may comprise a part of the volume 206 of FIG. 2. The disk regions 502 denote physical locations on the platters of the disk 500. Each disk region 502 may comprise a predetermined amount of storage, for example 2 megabytes (MB). Each disk region 502 may store one or more files (or other logical data structures). Each disk region 502 is encrypted using a unique encryption key. The encryption keys are stored in the cryptographic key database 210 (see FIG. 2), which may be stored on the disk 500. The cryptographic key database is encrypted using the master key 316 (see FIG. 3).

Each disk region 502 may further be divided into smaller physical denominations, such as blocks. For example, a first disk region 502a comprises several blocks 504. Each block 504 may be a file or a portion of a file, such as a 4 Kbyte segment of a file. Note that a region 502 can also be defined as a single block. A file is a logical structure that includes pointers to physical blocks on the disk 500. For example, the data comprising the file 'A' is stored in the blocks 504c, 504d, and 504e. When referencing the file 'A', the file system follows several pointers to the blocks 504c, 504d, and 504e. It is understood that although the file 'A' is shown in contiguous blocks 504c, 504d, and 504e, that the blocks of a specific file may be stored in a noncontiguous fashion. For example, the file 'C' is stored in the two nonadjacent blocks 504g and 504i. It is further understood that a file may include blocks from several disk regions 502. However, for simplicity, the file 'A' is described in terms of the three blocks 504c, 504d, and 504e.

Figure 6:
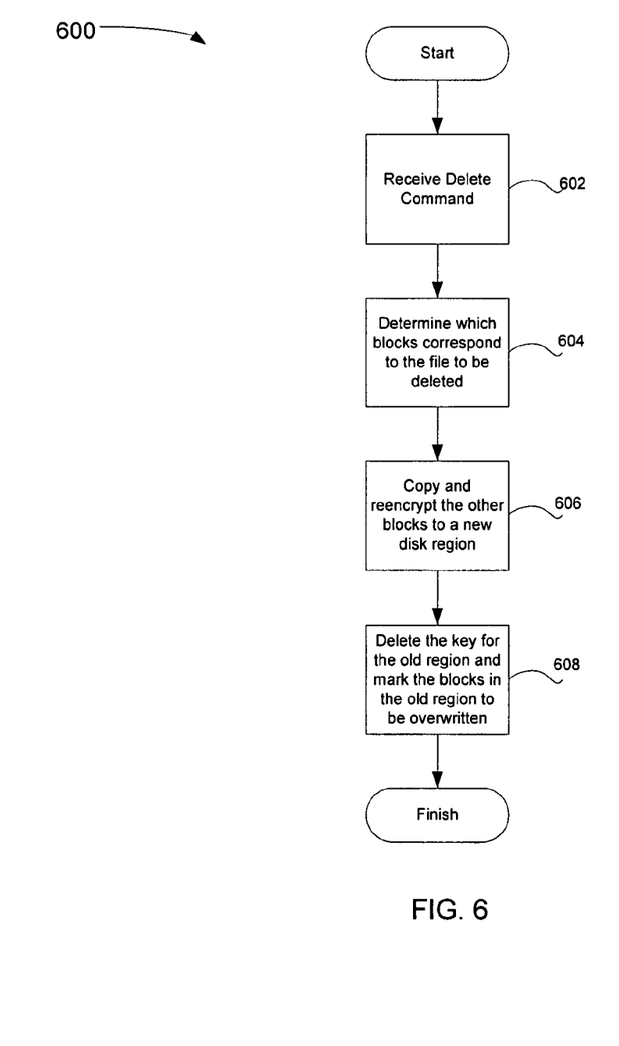
FIG. 6 is a flowchart describing a process for deleting and sanitizing a file, according to embodiments of the invention.

FIG. 6 is a flowchart describing a process 600 for deleting a file and sanitizing a file, in accordance with the technique introduced here. The process 600 will be described with reference to the example of FIG. 5. The process 600 is described in terms of a file 'A' stored in three blocks 504c, 504d, and 504e in a first disk region 502a. The first disk region 502a is encrypted using a first encryption key that is stored in the cryptographic key database 210 (see FIG. 2).

In operation 602, a delete command is received by the operating system 208 (see FIG. 2). The delete command may be issued by a user, an application, a system process, etc. According to one embodiment, an application may want to delete certain data at specific times. For example, a compliant data storage system may want to delete compliant data as soon as it expires. The delete command may be issued to delete a file or other data structure. According to the example shown here, a request to delete the file 'A' is received by the operating system 308 (see FIG. 3).

In operation 604, it is determined which blocks correspond to the file (or other data structure) to be deleted. As can be seen in FIG. 6, the file 'A' occupies the set of blocks 504c, 504d, and 504e. Other files have data stored in the remaining set of blocks 504a, 504b, and 504f-504i. A file can be stored using blocks in more than one disk region 502. However, the file 'A' is shown stored in only the first disk region 502a for clarity.

In operation 606, the remaining set of blocks in disk region 502a (i.e., blocks 502a, 502b, and 504f-504i, but not blocks 504c, 504d and 504e) are re-encrypted in place, by using a second (new) encryption key for disk region 502a. During the re-encryption process, the blocks are first decrypted using the first encryption key, and then encrypted using the new encryption key. The blocks 504c-504e comprising the file 'A' are not re-encrypted.

In operation 608, the first encryption key is deleted, and the blocks 504c-504e representing the file are marked as available, so that they may be overwritten. The first encryption key is deleted by overwriting the key in the cryptographic key database. The first encryption key may be overwritten using any one of several known techniques, including using any one of the well-known patterns (such as a "Guttman" pattern), writing zeroes over the key ("zeroing" the key), etc. According to one embodiment, the first encryption key may be overwritten only once, since the data that comprises an encryption key must be completely intact to be useful. Therefore, more robust sanitization techniques may not be necessary. Further, the cryptographic key database is encrypted using the master key 316 (see FIG. 3). The master key 316 is physically located within the system 300 of FIG. 3, and therefore a user or client must have access to the system 300 to gain access to the first encryption key. If a malicious user only has access to the disk 500 (see FIG. 5), the user will be unable to decrypt the cryptographic key database, and therefore will be unable to obtain the first encryption key. Once the first encryption key is discarded, the file 'A' has been sanitized, even though the blocks 504c-504e may not have been overwritten, since the data stored in the disk region 502a is unreadable without the first encryption key.

The technique introduced above has been described in the context of a network attached storage (NAS) environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

This invention has been described with reference to specific exemplary embodiments thereof. It will, however, be evident to persons having the benefit of this disclosure that various modifications changes may be made to these embodiments without departing from the broader spirit and scope of the invention. The specification and drawings are accordingly to be regarded in an illustrative rather than in a restrictive sense.

What is claimed is:

1. A method of disk sanitization comprising:
    encrypting data stored on a disk, including a set of blocks, by using a first encryption key; and
    in response to a request to delete the set of blocks,
        re-encrypting blocks stored on the disk other than the set of blocks, by using a second encryption key, and not re-encrypting the set of blocks; and
        deleting the first encryption key.

2. The method of claim 1, wherein the disk comprises a plurality of regions, and wherein said encrypting data stored on the disk comprises encrypting each of the plurality of regions with a different encryption key.

3. The method of claim 1, wherein deleting the first encryption key comprises:
    overwriting the first encryption key.

4. The method of claim 3, wherein overwriting the first encryption key comprises:
    overwriting a portion of a cryptographic key database including the first encryption key, wherein the cryptographic key database is encrypted using a master key.

5. The method of claim 1, wherein re-encrypting blocks stored on the disk other than the set of blocks comprises using a cryptographic module.

6. The method of claim 1, wherein the set of blocks comprises a file.

7. The method of claim 1, wherein re-encrypting blocks stored on the disk other than the set of blocks comprises:
    decrypting blocks stored on the disk other than the set of blocks, by using the first encryption key; and
    encrypting the blocks stored on the disk other than the set of blocks, by using the second encryption key.

8. The method of claim 1, further comprising marking the set of blocks so that the first disk region may be overwritten.

9. The method of claim 1, wherein the set of blocks represents a file.

10. The method of claim 1, wherein the set of blocks represents a portion of a file.

11. A system to perform disk sanitization, the system comprising:
    a disk including data encrypted using a first encryption key; and
    a processor configured to respond to a command to delete a first set of encrypted blocks on the disk, the first set of encrypted blocks representing a file or a portion thereof, by:
        decrypting blocks on the disk other than the first set of encrypted blocks,
        using a second encryption key to re-encrypt the blocks on the disk other than the first set of encrypted blocks, and not decrypting the first set of encrypted blocks, and
        deleting the first encryption key.

12. The system of claim 11, wherein the disk comprises a plurality of regions, and wherein the processor is further configured to encrypt data stored on the disk by encrypting each of the plurality of regions with a different encryption key, and wherein the first set of blocks is contained within a single region of the plurality of regions.

13. The system of claim 11, wherein the processor is at least part of a cryptographic module.

14. The system of claim 11, wherein the first and second cryptographic keys are stored in a cryptographic key database on the disk.

15. The system of claim 14, wherein the processor deletes the first encryption key by performing a media overwrite of the first encryption key.

16. The system of claim 15, wherein the media overwrite is a single pass overwrite.

17. The system of claim 14, wherein the cryptographic database is encrypted using a master key.

18. The system of claim 17, wherein the master key is accessible to the cryptographic module.

19. A method for performing media sanitization of a disk that includes a plurality of regions, the method comprising:
    encrypting data on the disk by using a different encryption key to encrypt each of the plurality of regions, the data on the disk including a file, wherein said encrypting includes encrypting the file using a first encryption key;
    storing the first encryption key in a cryptographic key database;
    receiving a command to delete the file; and
    in response to the command to delete the file,
        identifying a first set of blocks on the disk which belong to the file and a second set of blocks on the disk which do not belong to the file;
        re-encrypting the second set of blocks by using a second encryption key and not re-encrypting the first set of blocks; and
        deleting the first encryption key by overwriting a portion of the cryptographic key database corresponding to the first encryption key.

20. The method of claim 19, further comprising:
    encrypting the cryptographic key database using a master key.

21. The method of claim 19, further comprising:
    marking the first set of blocks so that the first set of blocks may be overwritten.

* * * * *